C. H. PRINZ.
LOCK.
APPLICATION FILED AUG. 9, 1916.
1,239,039.
Patented Sept. 4, 1917.
3 SHEETS—SHEET 1.
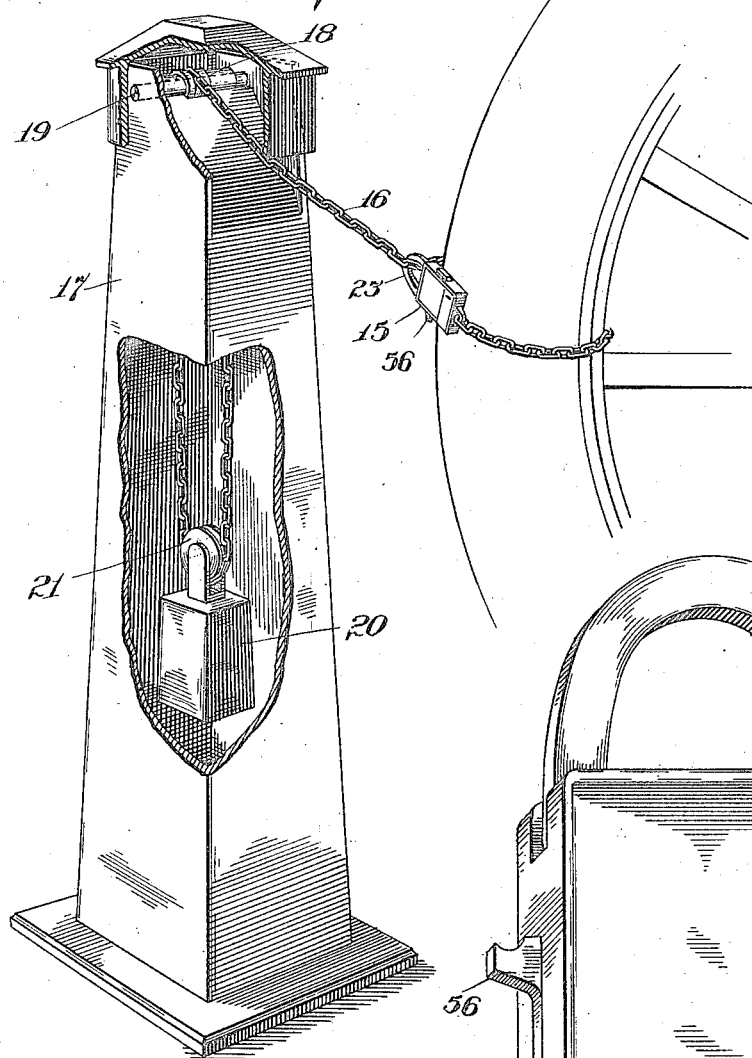
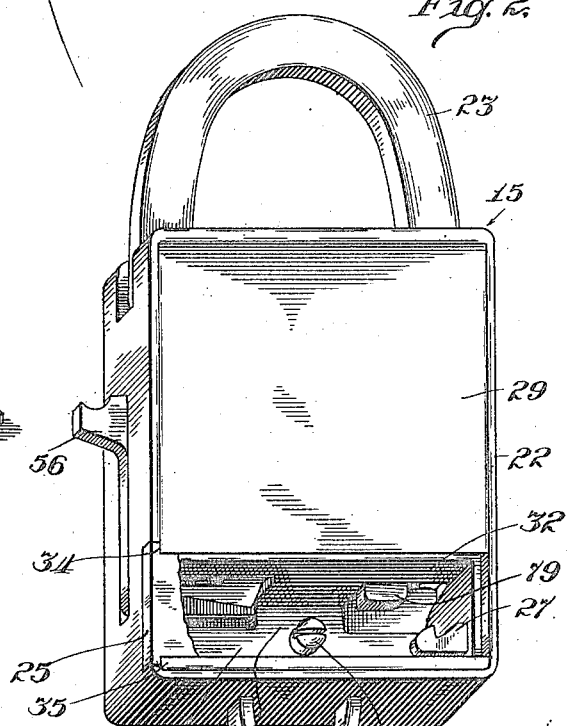
Inventor
Charles H. Prinz C. H. PRINZ.
LOCK.
APPLICATION FILED AUG. 9, 1916.
1,239,039.
Patented Sept. 4, 1917.
3 SHEETS—SHEET 2.
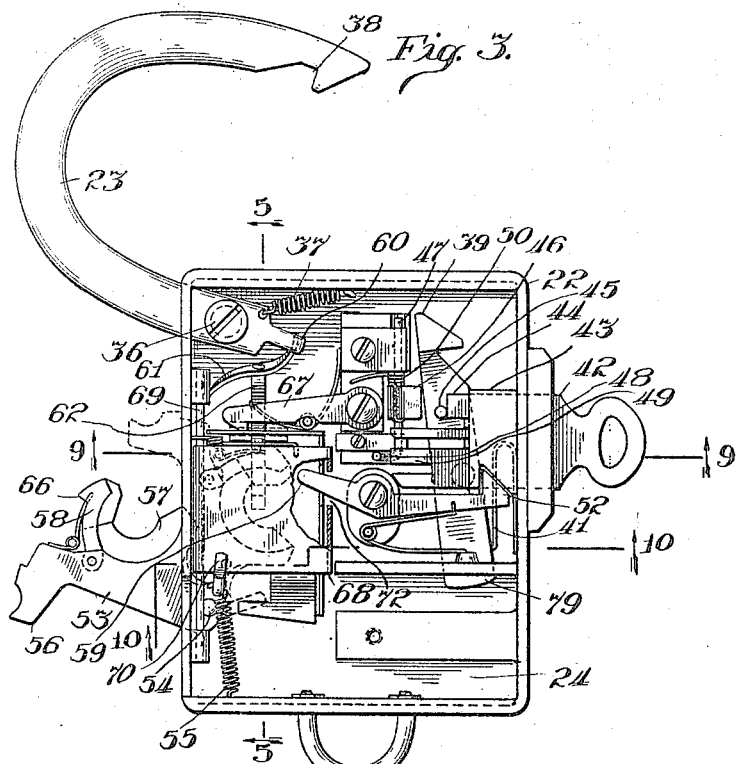
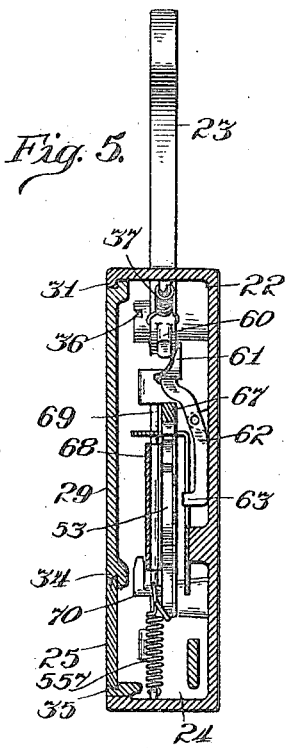
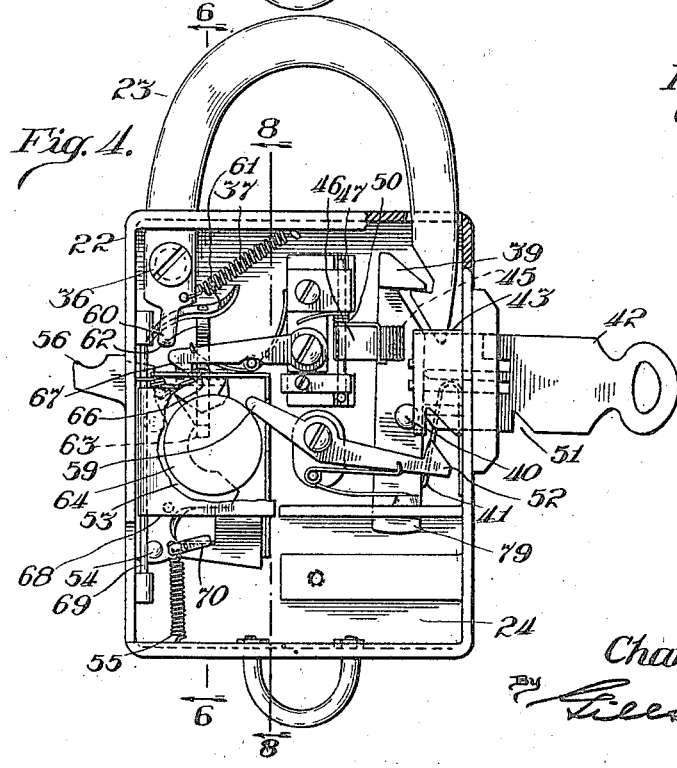
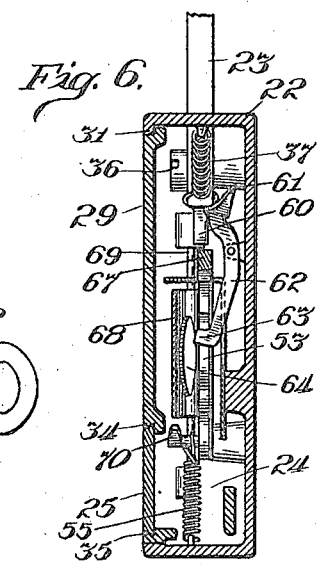
Inventor
Charles H. Prinz,
By Gileson & Gileson
Attorneys.

C. H. PRINZ.
LOCK.
APPLICATION FILED AUG. 9, 1916.
1,239,039. Patented Sept. 4, 1917.
3 SHEETS—SHEET 3.
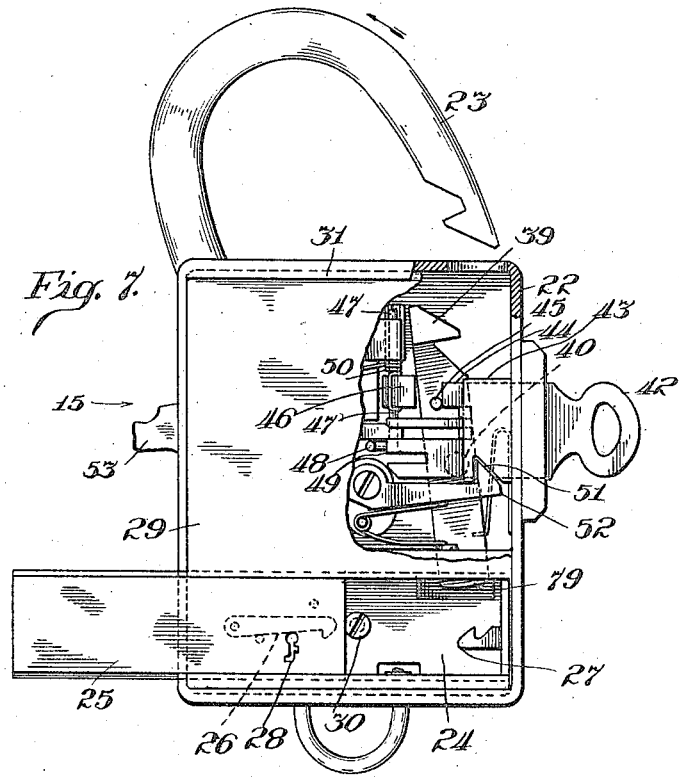
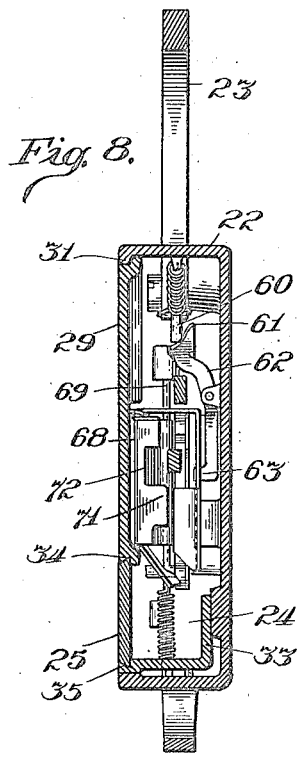
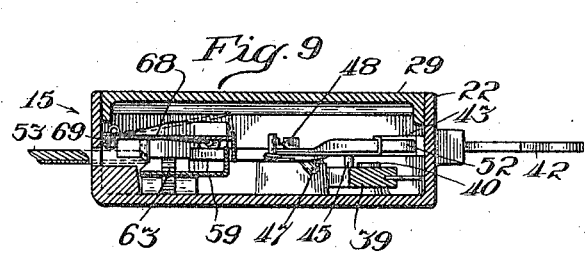
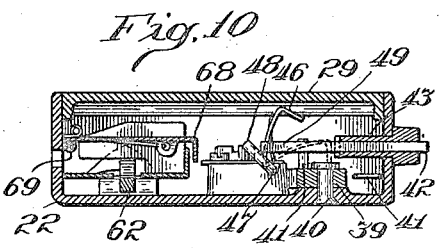
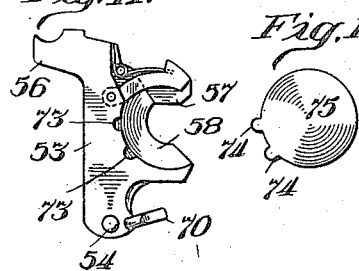
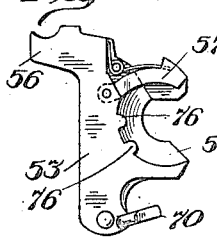
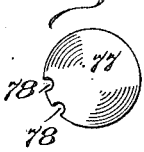
Inventor
Charles H. Prinz.
By Gieson & Gieson
Attorneys.

UNITED STATES PATENT OFFICE.

CHARLES H. PRINZ, OF FRUITVALE, CALIFORNIA.

LOCK.

1,239,039.

Specification of Letters Patent.

Patented Sept. 4, 1917.

Application filed August 9, 1916. Serial No. 113,915.

*To all whom it may concern:*

Be it known that I, CHARLES H. PRINZ, a citizen of the United States, and resident of Fruitvale, county of Alameda, and State of California, have invented certain new and useful Improvements in Locks, of which the following is a specification, and which are illustrated in the accompanying drawings, forming a part thereof.

The invention relates to locks which are dependent for their action on a coin or slug. The improved lock is especially intended for securing automobiles when left in public places, but is not restricted to that service. The invention is herein shown as embodied in a padlock, though it may be incorporated into locks of other types.

The principal object of the invention is to provide a lock which may be utilized by the insertion of a coin or slug especially adapted to coöperate with it, the insertion of the coin or slug releasing a key which is retained by the temporary user and serves both as a check and as means for opening the lock.

The invention consists in a structure such as is hereinafter described, and as illustrated in the accompanying drawings, in which—

Figure 1 is a detail of a post to which the lock may be anchored, and of a vehicle wheel, showing one manner of securing the locking device thereto;

Fig. 2 is a view, in perspective, of the lock, with some portions broken away;

Fig. 3 is a view of the lock with one side wall of the casing removed, showing the parts in disengaged position, movement of some of the parts being indicated in dotted lines;

Fig. 4 is a view similar to Fig. 3, the lock being closed;

Figs. 5 and 6 are sectional views on the line 5—5 of Fig. 3, showing the parts in different position;

Fig. 7 is a face view of the lock with portions broken away;

Fig. 8 is a sectional view on the line 5—5 of Fig. 3, showing the parts differently positioned from Figs. 5 and 6;

Fig. 9 is a sectional view on the line 9—9 of Fig. 3;

Fig. 10 is a sectional view on the line 10—10 of Fig. 3;

Figs. 11 and 12 are details of the coin or slug-holding device, showing slight deviations from the construction of Fig. 3; and Figs. 13 and 14 are views of the slugs adapted for use in connection with the holding devices illustrated, respectively, in Figs. 11 and 12.

The lock, generally designated by the numeral 15, may be conveniently attached to the end of a chain 16 which is anchored within a hollow post 17, the chain running loosely over a sheave 18 carried by a shaft 19 journaled in the upper end of the post, the inner end of the chain being suitably anchored to the inner wall of the post and the intermediate portion of the chain being looped downwardly and carrying a weight 20, suspended from the loop by means of a sheave 21. The free end of the chain being looped around a portion of a vehicle, such as the rim of its wheel, as shown in Fig. 1, and the hasp of the lock being hooked over the chain and the lock closed, the vehicle is secured but in a manner to permit movement to the extent of the length of the chain.

The invention is shown in the drawings as embodied in a padlock having a casing 22 and a hasp 23. Within the bottom of the casing 22 there is provided a coin or slug receptacle 24, having an openable slide 25 which may be locked in closed position by a latch 26, coöperating with a hook 27 fixed within the casing, a suitable key-hole 28 being provided for the insertion of a key for raising the latch. Preferably one side, 29, of the casing is removable to permit access to the locking mechanism.

To prevent unauthorized removal of the side of the casing it is preferably held in place as by means of a screw 30, located within the receptacle 24, and to facilitate this method of attachment the upper edge of the plate 29 is lipped under a flange 31, depending from the top wall of the body of the casing, and at its lower end is bent inwardly, as shown at 32, to form the upper wall of the receptacle 24, and then continued to the bottom of the casing, as shown at 33, the screw 30 being set through the part 33 and into the opposite wall of the casing. The plate 29 is undercut, as indicated at 34, along the line at which it is bent inwardly to form the wall 32, thus forming one of the ways for the slide 25, the opposite way 35 being formed across the bottom of the casing.

The hasp is pivoted at 36 within the casing, and is thrown open by means of a spring, as 37. The free end or nose of the hasp is provided with a hook 38, adapted to enter a suitable aperture in the casing and to coöperate with a hooked lever 39, pivoted within the casing at 40, a spring, as 41, being provided for normally advancing the hooked end of the lever into engaging relation with the hasp. A key 42, suitably configured for the purpose of security, is adapted to enter a similarly configured aperture or socket 43 in an edge wall of the casing, and is provided with an abutment 44, adapted to engage a stud 45 on the lever 39 by a thrust action for the purpose of disengaging the lever from the hasp.

To prevent the use of an implement other than the key adapted for use in connection with the lock, for the purpose of pushing back the lever 39, the stud 45 is covered, when the lock is closed, by means of a shield 46, carried by a spindle 47, which is provided with a crank-arm 48 adapted to be engaged by an abutment 49 on the key 42 before the abutment 44 reaches the stud 45. A spring 50 normally holds the shield in advanced position, as shown in Fig. 4.

The insertion of the key 42 first causes the rocking of the spindle 47, by reason of the engagement of the abutment 49 with the crank-arm 48, thus raising the shield and uncovering the stud 45. Further inward movement of the key forces back the lever or latch 39, releasing the hasp. Simultaneously with the disengagement of the lever 39 from the hook 38 of the hasp, a spring latch 52 enters a notch 51 in the lower edge of the key and thereby prevents the withdrawal of the key and the reëngagement of the hasp hook with the holding lever until the latch is withdrawn by the operation of the coin or slug-carrying mechanism.

The coin or slug carrier takes the form of an arm 53, fitting within a slot in the edge face of the casing opposite that at which the key 42 enters, being pivoted within the casing, as shown at 54, and normally held within the slot by means of a spring 55. This arm is provided with a projecting grip member 56, by means of which it may be drawn out to receive the coin or slug. On its inner face the arm 53 is provided with a seat 57 for receiving the coin or slug, and a pivoted spring-advanced grip member 58 for closing down upon the coin or slug to temporarily retain it upon the seat.

When it is desired to use the lock a coin or slug is placed upon the carrier and is moved into the casing by the action of the spring 55, and engages a backwardly projecting arm 59 of the latch 52, rocking the latter on its pivot and disengaging it from the key, which is thereupon partially ejected from the casing by the action of the spring 50, the lever 39 being thereupon swung to engaging position with the hasp by the action of the spring 41.

As the hasp enters the casing an arm 60, projecting from its heel, engages a cam plate 61 mounted on one end of a lever 62, the opposite end of which is provided with a toe 63 which is, by the cam action, thrown against the disk face of the coin or slug 64, forcing it laterally from the seat 57 and permitting it to drop through the chute 65 into the receptacle 24.

Upon the entry into the casing of the carrier 53 with a coin or slug, a notch 66 on the back of the grip member 58 is engaged by the spring-advanced hook 67, thereby preventing the withdrawal of the carrier until the coin or slug is displaced therefrom by the closing of the lock. The discharge of the coin or slug from the carrier permits the grip member to drop under the influence of its spring, disengaging it from the hook 67 and permitting the free withdrawal of the carrier.

A spring-raised cover plate 68 is pivoted adjacent the slot within which the carrier 53 fits, being shown as mounted upon a pivot rod 69. This plate is forced inwardly as the carrier 53 is drawn out, by the action of a cam finger 70 attached to the carrier and engaging over the shield. The plate 68 is provided at its free end with a flange 71, having a notch, as shown at 72, for receiving the arm 59 of the latch 52 when the latter is in position for engaging the key 42. As the plate 68 is always advanced by the withdrawal of the carrier 53, the notched flange 72 prevents the manipulation of the key-holding latch by the insertion of an instrument through the carrier-receiving slot. When the carrier is within the casing the plate 68 is always raised by the action of its spring, and thereby disengaged from the key-holding latch.

As shown in Figs. 3 and 11, the carrier 53 is adapted for use in connection with a coin, such as a dime. In Fig. 11 the carrier is shown as provided with notches 73 in its seat for receiving complementary lugs 74 formed on the periphery of a slug 75, otherwise shaped and corresponding in size with the coin which may be used. The preferable construction, however, is that shown in Fig. 12, in which the carrier 53 is provided with instanding lugs 76 in its side, and a slug 77 is used which has complementary notches 78 in its periphery for engaging the lugs.

When the form of carrier illustrated in Figs. 3 and 11 is employed, any one may use the lock by merely inserting a coin, or for convenience, when the construction of Fig. 11 is followed, an habitual user may be supplied with one or more suitable slugs. When the construction of Figs. 12 and 14 is followed, the lock may be limited to the use of such persons only as are provided with the slug, it being impossible to operate its mechanism by means of a coin or slug which will not fit the carrier seat.

The proprietor of the parking station is provided with a key for controlling the slide 25, and may remove the coin or slug which has been utilized in attaching the lock to a vehicle.

In order to permit the opening of the lock in the absence of the key 42, the lever 39 is prolonged into the receptacle 24, as shown at 79, so that it may be manipulated when the slide 25 is withdrawn.

Inasmuch as the effectiveness of the coin which may be used in setting the hasp-engaging lever or latch is dependent upon its size only, its action not being controlled by its weight or composition, it operates only as a slug, and it will therefore be understood that where the word "slug" is employed in the appended claims it includes a suitable coin.

A preferred embodiment of the invention is disclosed. Various details may be differently worked out, and I do not, therefore, desire to be limited to the particular construction shown.

I claim as my invention—

1. In a lock, in combination, a locking element, means including a key for holding the locking element in retracted position, and means controllable by a slug for releasing the holding means.

2. In a lock, in combination, a locking element, means including a key for holding the locking element in retracted position, and means controllable by a slug for releasing the holding means withdrawable only through the action of the slug.

3. In a lock, in combination, a locking element, means including a key for holding the locking element in retracted position, means controllable by a slug for releasing the holding means, an openable slug receptacle, and an independent lock for such receptacle.

4. In a lock, in combination, a locking element, means including a key for holding the locking element in retracted position, means controllable by a slug for releasing the holding means, a spring-advanced shield for preventing the reëngagement of the key with the locking element, and means controllable by the key for withdrawing the shield.

5. In a lock, in combination, a locking element, means comprising a latch for holding the locking element in retracted position, a withdrawable slug carrier adapted to force a slug into engagement with the latch for releasing such latch, and a detent for the latch adapted to be engaged therewith by the withdrawal of the carrier.

6. In a lock, in combination, a locking element, means comprising a latch for holding the locking element in retracted position, a withdrawable slug carrier adapted to force a slug into engagement with the latch for releasing such latch, and a normally disengaged detent for the latch adapted to be engaged therewith by the withdrawal of the carrier.

7. In a lock, in combination, a hasp, a movable latch for engaging the hasp, slug releasable means for holding the latch out of engaging position, a slug carrier, and means actuated by the hasp for discharging a slug from the carrier.

8. In a lock, in combination, a casing, a hasp, a spring latch for engaging the hasp, a key for holding the latch in disengaging position, and a slug-controlled latch for securing the key in the casing.

9. In a lock, in combination, a casing, a hasp, a spring latch for engaging the hasp, a key adapted by its inthrust to disengage the latch, a spring-advanced shield for covering the key-engaging portion of the latch, and an arm engageable by the key for removing the shield.

CHARLES H. PRINZ.

Witnesses:
SAMUEL F. ESTELL,
MARGARET L. ESTELL.